(12) United States Patent
Carter

(10) Patent No.: US 10,455,267 B1
(45) Date of Patent: Oct. 22, 2019

(54) EXTRACTION OF MEASUREMENT DATA FOR THIRD PARTIES FROM AN SCTE 130-3 BASED DEPLOYMENT

(71) Applicant: BlackArrow, San Jose, CA (US)

(72) Inventor: Leslie M Carter, San Jose, CA (US)

(73) Assignee: Cadent Tech, Inc., Philadelphia, PA (US)

( * ) Notice: Subject to any disclaimer, the term of this patent is extended or adjusted under 35 U.S.C. 154(b) by 0 days.

(21) Appl. No.: 14/860,685

(22) Filed: Sep. 21, 2015

Related U.S. Application Data

(60) Provisional application No. 62/053,103, filed on Sep. 19, 2014.

(51) Int. Cl.
- *H04H 60/32* (2008.01)
- *H04N 21/2668* (2011.01)
- *H04N 21/81* (2011.01)
- *H04N 21/258* (2011.01)
- *H04N 21/25* (2011.01)

(52) U.S. Cl.
CPC ....... *H04N 21/2668* (2013.01); *H04N 21/251* (2013.01); *H04N 21/25866* (2013.01); *H04N 21/812* (2013.01)

(58) Field of Classification Search
None
See application file for complete search history.

(56) References Cited

U.S. PATENT DOCUMENTS

| | | | | |
|---|---|---|---|---|
| 2008/0288976 A1* | 11/2008 | Carson | ............... | G06Q 30/0241 725/34 |
| 2013/0254041 A1* | 9/2013 | Sherwin | ................. | G06Q 30/02 705/14.68 |
| 2014/0123173 A1* | 5/2014 | Mak | ................. | H04N 21/44016 725/32 |
| 2014/0149230 A1* | 5/2014 | Shepard | ............. | G06Q 30/0273 705/14.69 |
| 2015/0213488 A1* | 7/2015 | Karande | ............ | G06Q 30/0249 705/14.45 |

OTHER PUBLICATIONS

ANSI/SCTE 130-3 2010—Digital Program Insertion—Advertising Systems Interfaces Part 3 Ad Management Service (ADM) Interface (Year: 2010).*

(Continued)

*Primary Examiner* — William J Kim

(74) *Attorney, Agent, or Firm* — RowanTELS LLC

(57) ABSTRACT

In some embodiments, a method may include receiving subscriber metadata and ad asset metadata from ad campaign manager logic and provisioning the subscriber metadata and the ad asset metadata via a central controller to a subscriber information system and a content information system, respectively; intercepting ad decision messages, ad impression messages, and ad response messages with a digital ad router; accumulating the ad decision messages, the ad impression messages, and the ad response messages in a control structure applied to a measurement system; and operating the measurement system to correlate subregions of the control structure with the subscriber metadata and the ad asset metadata to form a measurement signal to control the ad campaign manager logic.

6 Claims, 5 Drawing Sheets

(56) References Cited

OTHER PUBLICATIONS

ANSI/SCTE 130-4 2011—Digital Program Insertion—Advertising Systems Interfaces Part 4 Content Information Service (CIS) (Year: 2011).*

ANSI/SCTE 130-5 2010—Digital Program Insertion—Advertising Systems Interfaces Part 5—Placement Opportunity Information Service (Year: 2010).*

ANSI/SCTE 130-6 2010—Digital Program Insertion—Advertising Systems Interfaces Part 6—Subscriber Information Service (SIS) Year: 2010).*

* cited by examiner

EXTRACTION OF MEASUREMENT DATA FOR THIRD PARTIES FROM AN SCTE 130-3 BASED DEPLOYMENT

CROSS-REFERENCE TO RELATED APPLICATIONS

This application claims priority and benefit under 35 u.s.c. 119 to U.S. application Ser. No. 62/053,103, filed on Sep. 19, 2014, which is incorporated herein by reference in its entirety.

BACKGROUND

The SCTE (Society of Cable Telecommunications Engineers) has defined an addressable advertising system architecture that utilizes different information systems to assist in the selection of digital ad content for insertion into or presentation with program content. The advertising decision system (SCTE 130-3) identifies and coordinates the insertion of ads into media systems which may include linear TV advertising and video on demand, among other possibilities. Ads and program content can be classified and described in the content information system (SCTE-4). An ad decision system component (ADS) may register with a content CIS system to search for content and receive alerts when specific types of content are available. A placement opportunity information service (POIS) (SCTE 130-5) may be operated to identify when advertising inventory is available for use. The subscriber information service (SIS) (SCTE 130-6) may be operated to obtain information related to subscriber activities (preferences or viewing habits).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

Figure 1:
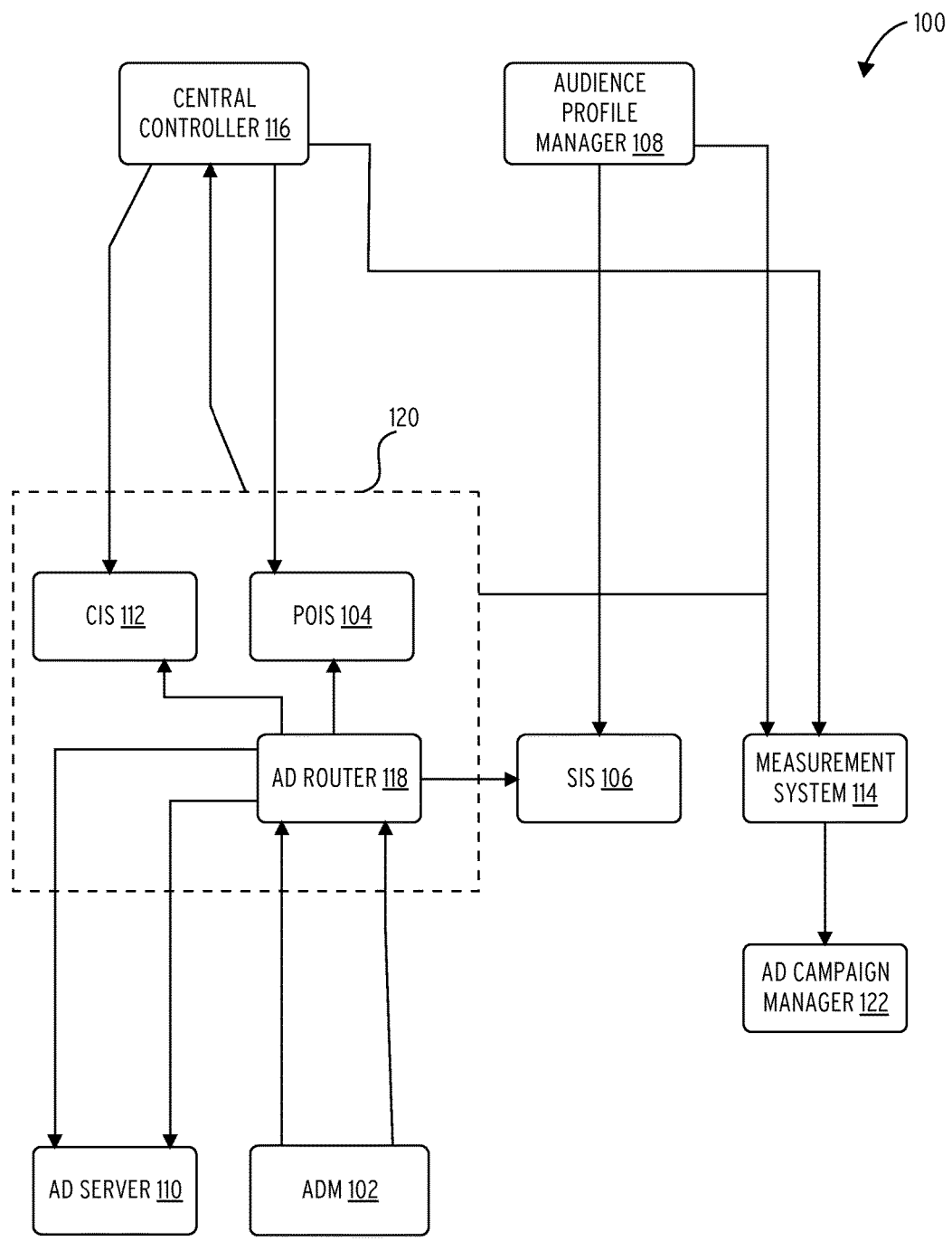
FIG. 1 illustrates an aspect of a digital advertisement measurement system 100 in accordance with one embodiment.

"plugable" in this context refers to a logic block that is part of a family of logic blocks, each having a common input interface (possibly with specific extensions that vary across the family) and a common output interface (again possible with extensions). The internal logic of plugable logic may vary from block to block, performing different processing/transformations of the inputs to the outputs.

DESCRIPTION

The following disclosure may make reference to these terms:

Ad decision service (ADS)—a system component that determine which ads are selected to be combined with other program content and how they will be combined. Decisions made by the ADS may be specific (date and time) or they may be a set of conditions and parameters (such as geographic zones and subscriber profile information). ADS is part of the SCTE 130 advertising specification series.

Ad Management Service—ADM—a system component which controls which coordinates the insertion of advertising media into program streams. ADS units register with one or more ad management (ADM) devices which control the actual splicing of ads with program streams.

Content Information Service—CIS—a system component that identifies and manages descriptive data (metadata) for programs and advertising messages. The CIS system allows for the searching, discovery, and alerting of the availability of media items and their classifications.

Placement Opportunity Information Service—POIS—is system component that identifies and provides descriptions of placement opportunities for media (such as the availability to insert ads). The POIS may contain requirements and attributes that can include which platforms may be used, ownership rights, and policies that are used to coordinate the placement of media. Placement opportunities are content specific so they can vary based on the type of network, geographic location, or other associated content attributes.

Subscriber Information Service—SIS—is a system component that can store, process, and access subscriber information that can assist in the selection of ads. SIS enables behavioral targeting of ads. Because SIS captures personal information of viewers, SIS systems may be required to control access and limit identification information to ensure viewer privacy.

This disclosure may reference these abbreviations:
ADM—Ad management service
ADS—Ad decision service
CIS—Content information service
CRM—Customer relationship management
DMP—Data management platform
EPG—Electronic program guide
PAID—Provider/asset ID
POIS—Placement opportunity service
PSN—Placement status notification
ODCR—On demand commercial rating
SCTE—Society of Cable Telecommunication Engineers
SIS—Subscriber information service
VOD—Video on demand Disclosed herein are embodiments of a system and process for the extraction of measurement data for 3rd parties (e.g. Nielsen) from an [SCTE 130-3] based messaging system. Said system provides ad routing capabilities, and data is extracted from [SCTE 130-3] messages to provide keys that enable access to subscriber, program and ad asset metadata as well as decision, impression and engagement metrics. The specific fields to be extracted may be configurable. Input to the measurement system may be file (batch) based.

The measurement system may utilize the following:
Program asset metadata
ad asset metadata
subscriber metadata
[SCTE 130-3] PlacementRequest messages, which define
  keys to look up and access program asset and subscriber metadata and to connect PlacementRequest and PlacementResponse messages together.

[SCTE 130-3] PlacementResponse messages, which define keys to look up ad asset metadata and the key to connect PlacementResponse and PlacementStatusNotification messages together

[SCTE 130-3] PlacementStatusNotification messages, which provide an impression metric.

The system may implement and/or conform to various standardized technologies, such as [SCTE 130-3] ANSI/SCTE 130-3 2010—Digital Program Insertion—Advertising Systems Interfaces Part 3 Ad Management Service (ADM) Interface; [SCTE 130-4] ANSI/SCTE 130-4 2011—Digital Program Insertion-Advertising Systems Interfaces Part 4 Content Information Service (CIS); [SCTE 130-5] ANSI/SCTE 130-5 2010—Digital Program Insertion-Advertising Systems Interfaces Part 5-Placement Opportunity Information Service; [SCTE 130-6] ANSI/SCTE 130-6 2010—Digital Program Insertion-Advertising Systems Interfaces Part 6-Subscriber Information Service (SIS).

DRAWINGS

FIG. 1 illustrates an aspect of a digital advertisement measurement system 100 in accordance with one embodiment. The system comprises an ADM 102, POIS 104, SIS 106, audience profile manager 108, ad server 110, CIS 112, measurement system 114, central controller 116, and ad router 118. The POIS 104, CIS 112, and ad router 118 may be components of central runtime logic 120.

The ADM 102 is operated to provide a normalized [SCTE 130-3] interface between the ad decision components of the central controller 116 and the rest of the service provider infrastructure. The ADM 102 originates ad requests and provides normalized measurement data. A service provider source system (not shown in FIG. 1) provides the digital advertisement measurement system 100 with assets metadata.

The ad router 118 is operated to service ad requests. Typically requests are received from a component involved in the downstream play out infrastructure that is sparsely populated. This component then invokes various request decoration services such as the SIS 106, CIS 112 (and POIS 104 in non-ODCR use cases) before invoking the ad server 110. This component also receives return path information and is responsible for disseminating it to the appropriate original decision maker, and to the measurement system 114.

The ad server 110 component is operated to determine which available ad should be placed for a particular placement opportunity.

The central controller 116 component operates to provide ingress/egress for metadata from the service provider system to the digital advertisement measurement system 100. It facilitates communication between the management and runtime components as well as external systems.

The CIS 112 component is operate to provide content information service request decoration data based on content context utilizing [SCTE 130-4]. This component also provides ad breakpoint information for both the viewed and current episodes of a streamed content asset.

The measurement system 114 is operated to transform metadata from the central controller 116 as well as log data from the ad router 118 and generate a set of measurement data. The measurement system 114 may process data in batch (as files) and not operate as a real-time service.

The POIS 104 is operated to provide ad placement opportunity and ownership information via [SCTE 130-5] calls made by the ad router 118.

The audience profile manager 108 is operated to ingest data provided by the subscriber data source(s). The format of the subscriber data may be proprietary (i.e. non [SCTE 130-6]) and therefore may require a transforming adapter to normalize the provided data. The audience profile manager 108 may be implemented as a browser based tool that allows users to understand reach of various audience qualifiers, create aggregated audience profiles from discrete audience qualifiers and designate them for use later on as user preference items. The audience profile manager 108 may be operated to research and classify subscribers across all of the addressable platforms (e.g. QAM VOD, IP ABR, EPG, etc.).

The SIS 106 is operated to receive data from the audience profile manager 108 and provide the data to a user preference distribution component via [SCTE 130-6]. The same SIS 106 may be used across all of the addressable platforms and may provide low latency, high throughput device based lookups as well as longer running asynchronous queries and query registration/notifications.

A measurement partner (not illustrated in FIG. 1) may be implemented by a service provider system that provides subscriber data to the audience profile manager 108. The data may be source directly from the service provider (e.g. CRM and billing systems) via a data management platform (DMP) (e.g. Experian, Claritas, etc.) or from an advertiser/agency via a 3rd party blind match process facilitated by a DMP.

Measurements from the measurement system 114 may be applied directly or via the measurement partner to operate an ad campaign manager 122, which in turn will affect the operation of the ad server 110, ADM 102, ad router 118, and other components of the digital advertisement measurement system 100, thus completing a control feedback system.

Figure 2:
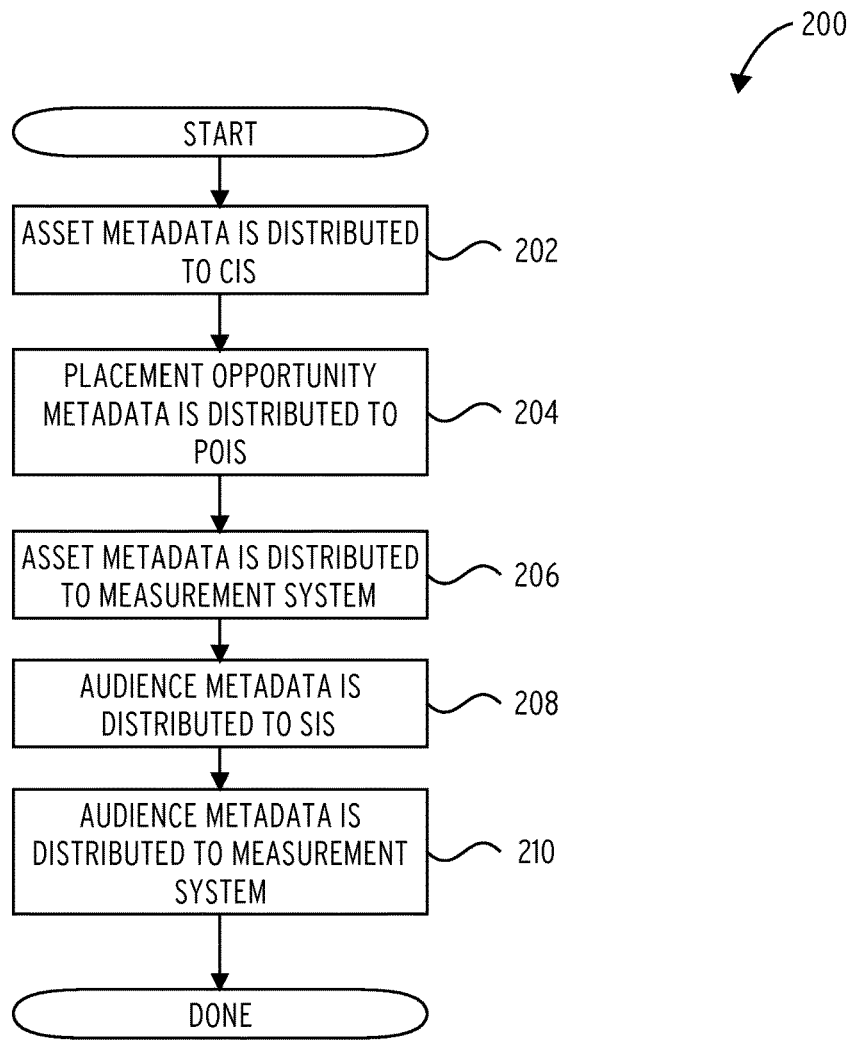
FIG. 2 illustrates an aspect of a provisioning process for digital advertisement engagement measurement 200 in accordance with one embodiment.

FIG. 2 illustrates an aspect of a provisioning process for digital advertisement engagement measurement 200 in accordance with one embodiment.

Asset metadata is distributed to BlackArrow Central CIS from BlackArrow Central (Management) at block 202. Placement opportunity metadata is distributed to BlackArrow Central POIS from BlackArrow Central (Management) at block 204. Asset metadata is distributed to BlackArrow Measurement component from BlackArrow Central (Management) at block 206. Audience metadata is distributed to BlackArrow Audience SIS from BlackArrow Audience Profile Manager at block 208. Audience metadata is distributed to BlackArrow Measurement component from BlackArrow Audience Profile Manager at block 210.

Figure 3:
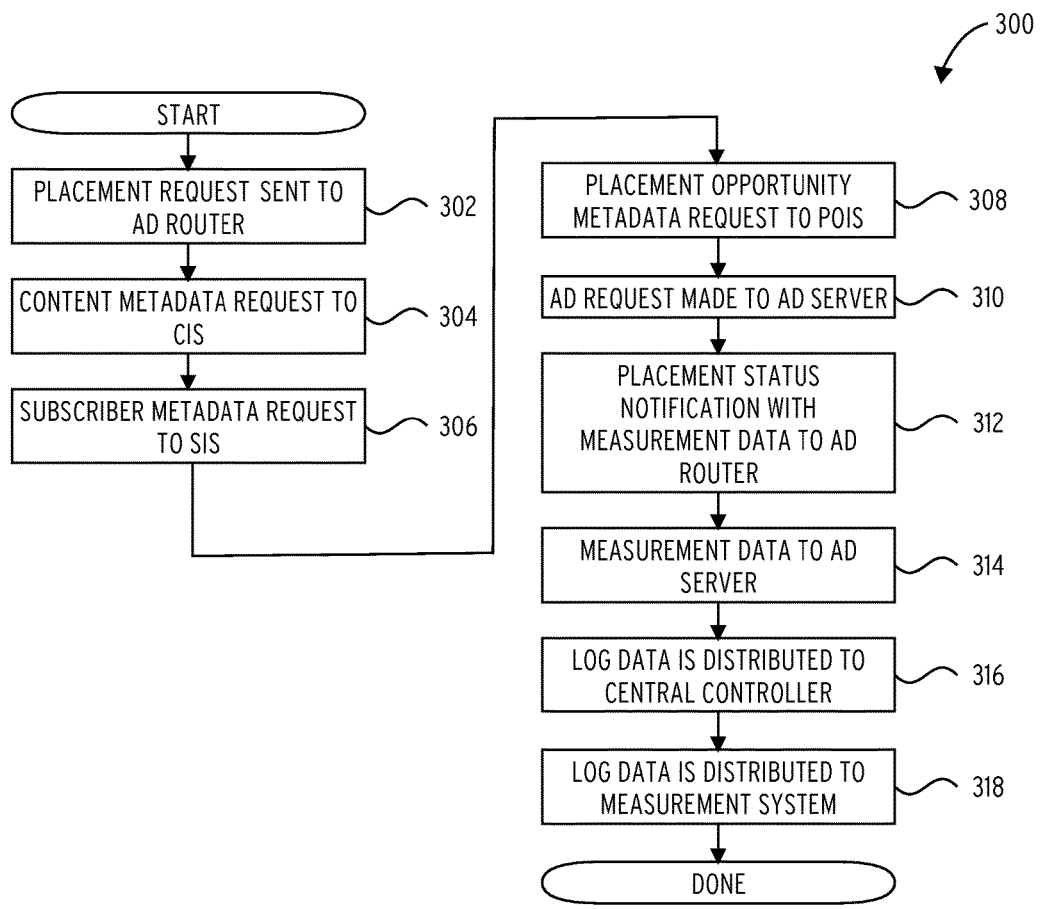
FIG. 3 illustrates an aspect of a process to measure audience engagement with digital advertising 300 in accordance with one embodiment.

FIG. 3 illustrates an aspect of a process to measure audience engagement with digital advertising 300 in accordance with one embodiment.

The process to measure audience engagement with digital advertising 300 may take place in four phases.

(I) Distribute program, ad and subscriber metadata

1. A service provider (e.g., a cable television network operator) provides the system with program asset metadata (e.g., in the form of ADI 1.1). 2. The service provider provides the system with ad asset metadata (e.g., in the form of ADS 1.1). 3. The service provider provides subscriber metadata (e.g., in the form of a CSV).

The metadata provided by service provider is ingested and stored by the measurement system.

(II) Play VOD Title

1. A subscriber operates an EPG, companion or mobile device to discover VOD title (for example). 2. The subscriber selects the VOD title for playback. 3. This selection triggers series of events to initiate an ad request via the ADM.

(III) Generate Decision Event Data

1. The ADM signals the Ad Router with an [SCTE 130-3] PlacementRequest at VOD session start. 2. The Ad Router records the [SCTE 130-3] PlacementRequest in message file. 3. The Ad Router performs request decoration and ad routing function. 4. The Ad Router creates a [SCTE 130-3] PlacementResponse message from unifying ad responses from service provider and content provider ad servers. 5. The Ad Router records the [SCTE 130-3] PlacementResponse in a message file.

(IV) Generate Impression Event Data

1. The ADM calls the Ad Router with an [SCTE 130-3] PlacementStatusNotification message. 2. The Ad Router records the [SCTE 130-3] PlacementStatusNotification in the message file.

An [SCTE 130-3] PlacementRequest message sent to BlackArrow Central Ad Router from ADM at block 302. An [SCTE 130-4] content metadata request from BlackArrow Central CIS by BlackArrow Central Ad Router at block 304. An [SCTE 130-6] subscriber metadata request from BlackArrow Central SIS by BlackArrow Central Ad Router at block 306. An [SCTE 130-5] placement opportunity metadata request from BlackArrow Central POIS by BlackArrow Central Ad Router at block 308. An ad request made to ad server at block 310. The ad server could be the BlackArrow Campaign ADS or a 3rd party ADS. An [SCTE 130-3] PlacementReponse is then returned from the BlackArrow Central Ad Router to the ADM. The ADM makes an [SCTE 130-3] PlacementStatusNotification with measurement data to BlackArrow Central Ad Router at block 312. The BlackArrow Ad Router provides measurement data to ad server at block 314. Log data is distributed to BlackArrow Central (Management) from BlackArrow Central (Runtime) for standard reporting and analytics at block 316. Log data is distributed to BlackArrow Measurement from BlackArrow Central (Runtime) at block 318.

Measurement data is made available to the Measurement Partner from the BlackArrow Measurement component.

Figure 4:
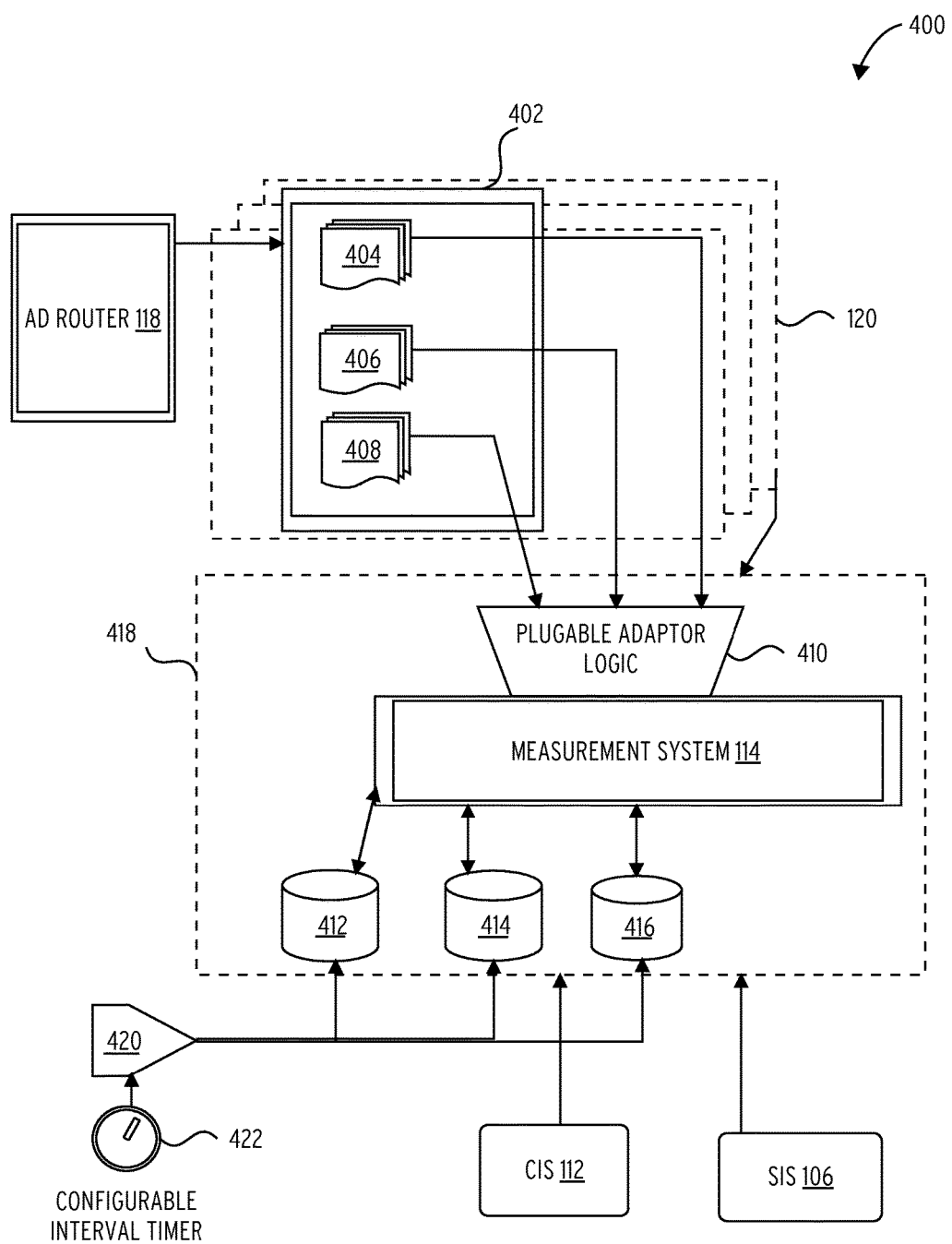
FIG. 4 illustrates an aspect of measurement system configuration logic 400 in accordance with one embodiment.

FIG. 4 illustrates an aspect of measurement system configuration logic 400 in accordance with one embodiment.

The input controls to the measurement system 114 component include a batch measurement control structure 402 generated by the ad router 118.

The batch measurement control structure 402 may comprise three types of sub-control structures to operate the measurement system 114: PlacementRequest sub-control 404, PlacementResponse sub-control 406, and PlacementStatusNotification sub-control 408. Due to the different ways in which control values may be presented within each of these controls by different types of the ADM 102, the implementation of parsing these control structures may be performed by plugable adaptor logic 410 comprising a standard interface to the measurement system 114.

The measurement system 114 component retrieves the batch measurement control structure 402 from each of the central runtime logic 120 instances which are then read and parsed by the plugable adaptor logic 410. When the plugable adaptor logic 410 detects one of the PlacementRequest sub-control 404 it activates logic specific to the specific variant of the PlacementRequest sub-control 404 to extract the following control values which are then communicated to and impressed within the request store 412 (e.g., a nonvolatile storage element comprising database management logic).

Time of placement request
Placement request ID
Device ID
Program asset ID

When the plugable adaptor logic 410 detects one of the PlacementResponse sub-control 406 it activates logic specific to the variant of the PlacementResponse sub-control 406 to extract the following control values which are then communicated to and impressed within in the decision store 414. There may be a sub-control in the decision store 414 for each individual ad asset that has a corresponding decision. The control values stored in decision request store 412 are looked up by using the a reference value of or from the placement request ID.

Time of placement request (from request store 412)
Placement request ID (from request store 412)
Device ID (from request store 412)
Program asset ID (from request store 412)
Placement response ID
Creative asset ID When the plugable adaptor logic 410 detects one of the PlacementStatusNotification sub-control 408 it logic to process this specific variant of PlacementStatusNotification sub-control 408 to extract the following values which are then stored in the impression store 416. There may be a sub-control in the impression store 416 for each individual ad asset that which has a corresponding measurement. The control values stored in the request store 412 are looked up by using a reference value which may equal the placement request ID.

Time of placement request (from request store 412)
Placement request ID (from request store 412)
Device ID (from request store 412)
Program asset ID (from request store 412)
Placement response ID (from response request store 412)
Creative asset ID (from decision store 414)
Time of impression
Placement status notification ID The measurement system 114 operate based on the controls configured into the request store 412, and/or decision store 414, and or impression store 416 to generate measurements. The measurement system 114 may access each of the request store 412, decision store 414, and impression store 416, depending on the measurements being generated and their application. In one embodiment only the impression store 416 influences the operation of the measurement system 114 to produce applied measurements.

In one embodiment a single measurement apparatus 418 comprises the plugable adaptor logic 410, measurement system 114, request store 412, decision store 414, and impression store 416. The measurement system 114 may apply the program asset ID, creative asset ID and device ID to look up program, creative and subscriber controls, respectively. The measurement system 114 may access these controls directly from the SIS 106 and CIS 112 in order to 'decorate' the measurements with asset and subscriber data for application to modify or otherwise control the ad campaign manager 122.

In some embodiments, the measurement system 114 may cache subscriber and asset/program metadata provisioned to the CIS 112 and SIS 106 and may not access these components at runtime for the asset and subscriber data to include with the measurements. In other embodiments, the measurement system 114 may obtain subscriber and asset metadata from the central runtime logic 120, which maintains this data internally after provisioning to the CIS 112 and SIS 106.

Control values from the request store 412, decision store 414, and impression store 416 may have influence on the measurement system 114 for a configurable time period, e.g., no less than 72 hours after which configurable time period the controls may be deactivated or de-configured. De-activator/de-configure logic 420 may operate on the request store 412, decision store 414, and/or impression store 416 in response to a configurable interval timer 422.

Figure 5:
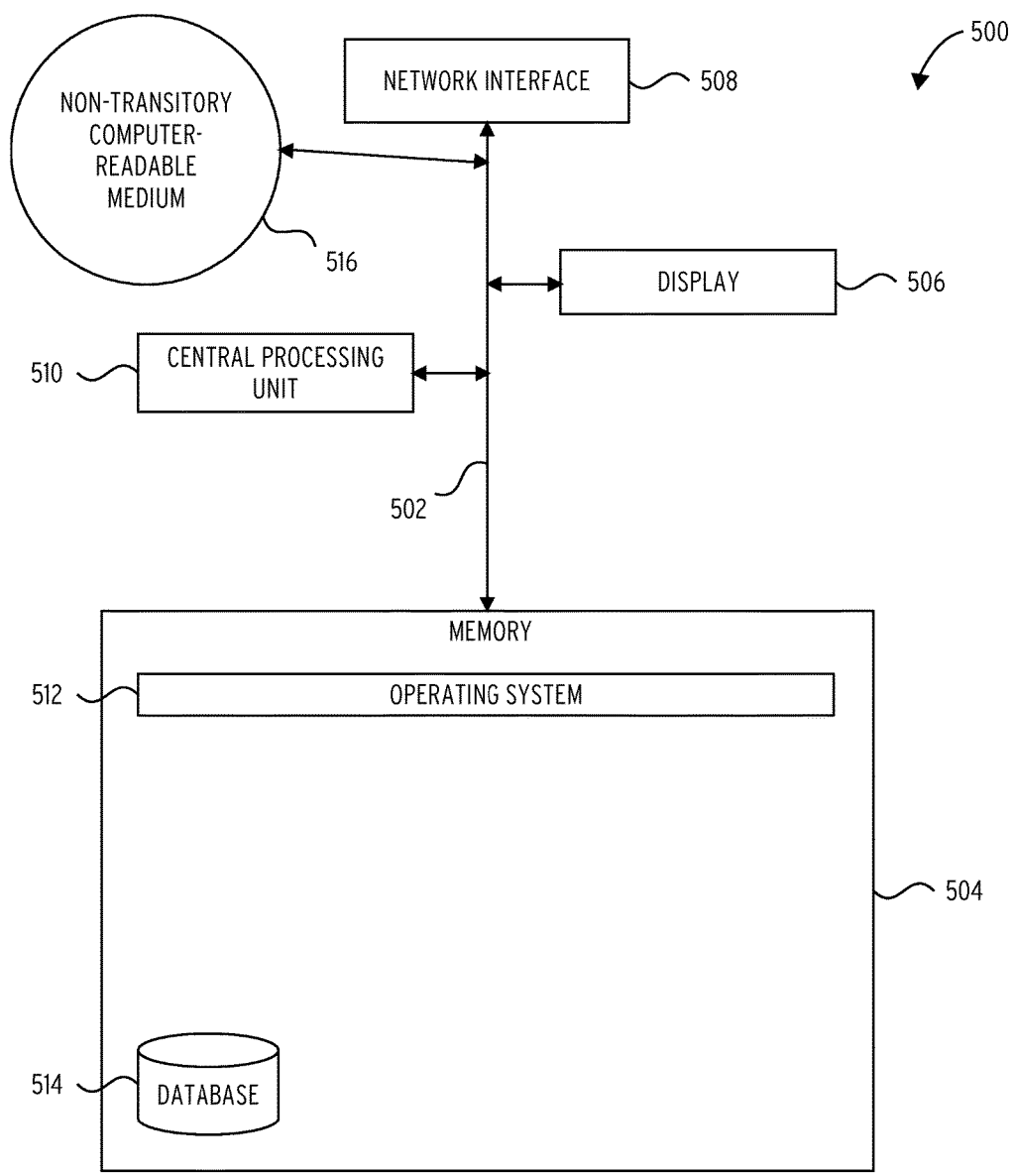
FIG. 5 illustrates an apparatus 500 in accordance with one embodiment.

FIG. 5 illustrates several components of an exemplary apparatus 500 in accordance with one embodiment. This general apparatus 500 may be adapted with logic to function as one or more of logic components described herein.

In various embodiments, apparatus 500 may include a desktop PC, server, workstation, mobile phone, laptop, tablet, set-top box, appliance, or other computing device that is capable of performing operations such as those described herein. In some embodiments, apparatus 500 may include many more components than those shown in FIG. 5. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, apparatus 500 may comprise one or more physical and/or logical devices that collectively provide the functionalities described herein. In some embodiments, apparatus 500 may comprise one or more replicated and/or distributed physical or logical devices.

In some embodiments, apparatus 500 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Apparatus 500 includes a bus 502 interconnecting several components including a network interface 508, a display 506, a central processing unit 510, and a memory 504.

Memory 504 generally comprises a random access memory ("RAM") and permanent non-transitory mass storage device, such as a hard disk drive or solid-state drive. Memory 504 stores an operating system 512.

These and other software components may be loaded into memory 504 of apparatus 500 using a drive mechanism (not shown) associated with a non-transitory computer-readable medium 516, such as a floppy disc, tape, DVD/CD-ROM drive, memory card, or the like.

Memory 504 also includes database 514. In some embodiments, server 200 (deleted) may communicate with database 514 via network interface 508, a storage area network ("SAN"), a high-speed serial bus, and/or via the other suitable communication technology.

In some embodiments, database 514 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic will vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

What is claimed is:

1. A measurement system comprising:
   a central controller;
   a digital ad router;
   a subscriber information system;
   a content information system;
   a plurality of central runtime instances;
   a plurality of pluggable adaptors;
   a request store;
   a decision store;
   an impression store;
   logic to receive subscriber metadata and ad asset metadata from ad campaign manager logic and provision the subscriber metadata and the ad asset metadata via the central controller to the subscriber information system and the content information system, respectively;
   logic to intercept ad decision messages, ad impression messages, and ad response messages with the digital ad router;
   the digital ad router to accumulate the ad decision messages, the ad impression messages, and the ad response messages in a batch measurement control structure for each of the plurality of central runtime instances;
   the batch measurement control structure comprising three types of sub-control structures to operate the measurement system, the sub-control structure comprising a placement request sub-control, a placement response sub-control, and a placement status notification sub-control;
   the plurality of pluggable adaptors each differently adapted to parse sub-control structures particular to a particular ad management service;
   the measurement system adapted to retrieve the batch measurement control structure from each of the plurality of central runtime instances and to provide each of the batch measurement control structures for parsing by one of the plurality of pluggable adaptors for the corresponding particular ad management service;
   each of the plurality of pluggable adaptors adapted to extract first control values from the placement request sub-control and to communicate the first control values to the request store;
   each of the plurality of pluggable adaptors adapted to extract second control values from the placement response sub-control and to communicate the second control values to the decision store;
   each of the plurality of pluggable adaptors adapted to extract third control values from the placement status notification sub-control and to communicate the second control values to the impression store;
   the measurement system configured to apply the first control values in the request store, the second control values in the decision store, and the third control values in the impression store to generate measurements.

2. The measurement system of claim 1, wherein the first control values in the placement request sub-control comprise:
   a time of placement request;
   a placement request ID;
   a device ID; and
   a program asset ID.

3. The measurement system of claim 1, wherein the second control values in the placement response sub-control comprise:
   a time of placement request;
   a placement request ID;
   a device ID;
   a program asset ID;
   a placement response ID; and
   a creative asset ID.

4. The measurement system of claim 1, wherein the third control values in the placement status notification sub-control comprise:
   a time of placement request;
   a placement request ID;

a device ID;
a program asset ID;
a placement response ID;
a creative asset ID;
a time of impression; and
a placement status notification ID.

5. The measurement system of claim 1, further comprising:
a different sub-control in the decision store for each individual ad asset that has a corresponding decision.

6. The measurement system of claim 1, further comprising:
a different sub-control in the impression store for each individual ad asset that which has a corresponding measurement.

* * * * *